US012188374B2

(12) United States Patent
Corsetti et al.

(10) Patent No.: US 12,188,374 B2
(45) Date of Patent: Jan. 7, 2025

(54) TURBINE ENGINE WITH COMPONENT HAVING A COOLING HOLE WITH A LAYBACK SURFACE

(71) Applicant: GENERAL ELECTRIC COMPANY, Schenectady, NY (US)

(72) Inventors: Brian Kenneth Corsetti, Reading, MA (US); John Curtis Calhoun, Cincinnati, OH (US); Dane Michael Dale, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 19 days.

(21) Appl. No.: 17/960,230

(22) Filed: Oct. 5, 2022

(65) Prior Publication Data

US 2024/0117743 A1 Apr. 11, 2024

(51) Int. Cl.
*F01D 5/18* (2006.01)

(52) U.S. Cl.
CPC ........ *F01D 5/187* (2013.01); *F05D 2240/307* (2013.01); *F05D 2250/14* (2013.01); *F05D 2250/38* (2013.01); *F05D 2260/2214* (2013.01)

(58) Field of Classification Search
CPC .............................. F01D 5/187; F05D 2240/30
See application file for complete search history.

(56) References Cited

U.S. PATENT DOCUMENTS 6,243,948 B1 * 6/2001 Lee .......................... F01D 5/005 29/402.06
6,287,075 B1 9/2001 Kercher
6,918,742 B2 * 7/2005 Liang ...................... F01D 5/186 415/115
7,549,843 B2 6/2009 Liang
7,985,050 B1 7/2011 Liang
9,328,617 B2 5/2016 Gautschi et al.
10,132,166 B2 * 11/2018 Bunker ................... F01D 5/145
10,208,605 B2 2/2019 Krumanaker et al.
10,316,672 B2 * 6/2019 Smith ..................... F01D 5/187
10,370,975 B2 8/2019 Roberts et al.
2005/0042074 A1 * 2/2005 Liang ...................... F01D 5/186 415/115
2006/0056969 A1 * 3/2006 Jacala ..................... F01D 5/187 416/97 R
2013/0205786 A1 * 8/2013 Kohli ...................... F01D 5/186 60/722
2013/0206739 A1 * 8/2013 Reed .................... B23K 26/146 219/121.71
2015/0184517 A1 * 7/2015 Smith ...................... B23H 9/14 416/97 R
2016/0251966 A1 * 9/2016 Bunker ................... F01D 5/186 416/97 R
2017/0089579 A1 * 3/2017 Bunker ................... F23R 3/007
2017/0107824 A1 4/2017 Krumanaker et al.
(Continued)

FOREIGN PATENT DOCUMENTS

EP 2925970 6/2014

*Primary Examiner* — Eldon T Brockman
(74) *Attorney, Agent, or Firm* — McGarry Bair PC

(57) ABSTRACT

An apparatus for an engine component in a turbine engine. The engine component including a wall with a cooling hole having a passage extending between an inlet fluidly coupled to a cooling fluid flow and an outlet at a heated surface. The cooling hole including a layup surface defining a first angle (α) and a layback surface defining a second angle (β).

20 Claims, 6 Drawing Sheets

(56) References Cited

U.S. PATENT DOCUMENTS

| | | | |
|---|---|---|---|
| 2018/0051566 A1* | 2/2018 | Bunker .................. | F01D 9/041 |
| 2018/0216472 A1 | 8/2018 | Lewis et al. | |
| 2020/0024965 A1 | 1/2020 | Frey et al. | |

* cited by examiner

TURBINE ENGINE WITH COMPONENT HAVING A COOLING HOLE WITH A LAYBACK SURFACE

STATEMENT REGARDING FEDERALLY SPONSORED RESEARCH OR DEVELOPMENT

This invention was made with government support under Contract No. 80GRC020F0081 awarded by The National Aeronautics and Space Administration (NASA). The government has certain rights in the invention.

TECHNICAL FIELD

This disclosure generally relates to a cooling hole in an engine component, and more specifically to a cooling hole with a layback surface.

BACKGROUND

Turbine engines, and particularly gas or combustion turbine engines, are rotary engines that extract energy from a flow of combusted gases. Turbine engines generally includes a compressor, combustor, and turbine in serial flow arrangement. The compressor compresses air which is channeled to the combustor where it is mixed with fuel. The mixture is then ignited for generating hot combustion gases. The combustion gases are channeled to the turbine, which extracts energy from the combustion gases for powering the compressor and fan, if used, as well as for producing useful work to propel an aircraft in flight or to power a load, such as an electrical generator.

Turbine blade assemblies include the turbine airfoil or blade and a platform. The turbine blade assembly includes cooling inlet passages as part of circuits in the platform and blade used to cool the platform and blade. The circuits can be fluidly coupled to cooling holes located along any of the multiple surfaces of the blade including at the tip.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION OF THE INVENTION

Figure 1:
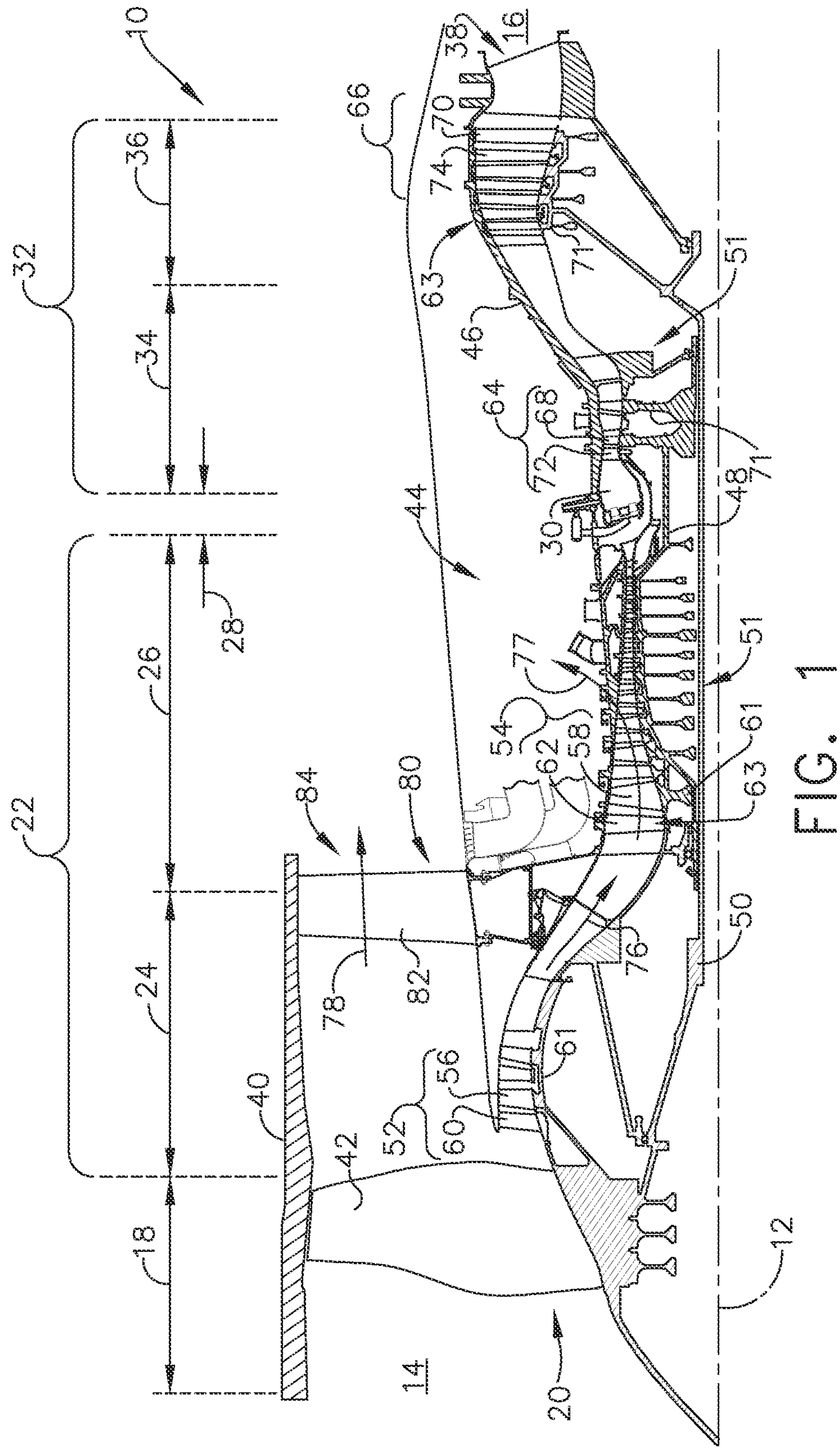
FIG. 1 is a schematic cross-sectional diagram of a turbine engine for an aircraft.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Aspects of the disclosure generally relate to cooling holes in airfoils, including cooled turbine engine blades. For purposes of illustration, the present disclosure will be described with respect to the turbine engine blade for an aircraft gas turbine engine. It will be understood, however, that aspects of the disclosure described herein are not so limited and may have general applicability within an engine, including compressors, as well as in non-aircraft applications, such as other mobile applications and non-mobile industrial, commercial, and residential applications. Traditional blades often include film cooling over portions of the blade surface, including at the trailing edge. Aspects of the disclosure provide for a blade with a cooling hole for both tip regions and trailing edge regions, providing for improved cooling performance at higher-temperature operations.

During operation of the gas turbine engine, various systems can generate a relatively large amount of heat. For example, a substantial amount of heat can be generated during operation of the thrust generating systems, lubrication systems, electric motors and/or generators, hydraulic systems or other systems. Accordingly, cooling mechanisms for the engine components therein is advantageous.

Cooling holes typically embody a "symmetrical opening" when viewed in profile. The rate at which a diffusing section for a cooling hole expands tends to be considerably uniform. In some symmetrical implementations, a layback surface defines one angle while a top wall of the cooling hole extends generally planar with respect to the top wall of the entire cooling hole. An "asymmetrical opening" described herein with regards to cooling holes is asymmetrical with respect to the same profile view of the cooling hole. While typically the layback surface defines a first angle either equal to or greater than a second angle defined between the centerline and the top wall, or layup surface, the first angle defined by the layback surface for the "asymmetrical opening" is actually less than the second angle defined by the layup surface. This geometry shift enables the same downstream end exhaust location for the "asymmetrical opening" as the "symmetrical opening" while moving the centerline aft and therefore providing more room for more cooling holes.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first," "second," and "third" can be used interchangeably to distinguish one component from another and are not intended to signify location or importance of the individual components.

The terms "forward" and "aft" as may be used herein, refer to relative positions within a gas turbine engine or vehicle, and refer to the normal operational attitude of the gas turbine engine or vehicle. For example, with regard to a blade, forward refers to a position closer to the leading edge of the airfoil and aft refers to a position closer to the trailing edge.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows.

The term "fluid" can be a gas or a liquid. The term "fluid communication" means that a fluid is capable of making the connection between the areas specified.

The singular forms "a", "an", and "the" include plural references unless the context clearly dictates otherwise.

As may be used herein, an "additively manufactured" component will refer to a component formed by an additive manufacturing (AM) process, wherein the component is built layer-by-layer by successive deposition of material. AM is an appropriate name to describe the technologies that build 3D objects by adding layer-upon-layer of material, whether the material is plastic, ceramic, or metal. AM technologies can utilize a computer, 3D modeling software (Computer Aided Design or CAD), machine equipment, and layering material. Once a CAD sketch is produced, the AM equipment can read in data from the CAD file and lay down or add successive layers of liquid, powder, sheet material or other material, in a layer-upon-layer fashion to fabricate a 3D object. It should be understood that the term "additive manufacturing" encompasses many technologies including subsets like 3D Printing, Rapid Prototyping (RP), Direct Digital Manufacturing (DDM), layered manufacturing and additive fabrication. Non-limiting examples of additive manufacturing that can be utilized to form an additively-manufactured component include powder bed fusion, vat photopolymerization, binder jetting, material extrusion, directed energy deposition, material jetting, or sheet lamination. It is also contemplated that a process utilized could include printing a negative of the part, either by a refractory metal, ceramic, or printing a plastic, and then using that negative to cast the component.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

As used herein, a stage of either the compressor or turbine is a pair of an adjacent set of blades and set of vanes in a flow direction, with both sets of the blades and vanes circumferentially arranged about an engine centerline. The blades rotate relative to the engine centerline and, in one example, are mounted to a rotating structure, such as a disk, to affect the rotation. A pair of circumferentially-adjacent vanes in the set of vanes are referred to as a nozzle. The vanes, in one example, are stationary, and mounted to a casing surrounding the set of blades, and, in another example of a counterrotating engine, are mounted to a rotating drum surrounding the set of blades. The rotation of the blades creates a flow of air through the vanes/nozzles.

FIG. 1 is a schematic cross-sectional diagram of a gas turbine engine 10 for an aircraft. The engine 10 has a generally longitudinally extending axis or engine centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form a core 44 of the engine 10, which generates combustion gases. The core 44 is surrounded by a core casing 46, which can be coupled with the fan casing 40.

A HP shaft or spool 48 disposed coaxially about the engine centerline 12 of the engine 10 drivingly connects the HP turbine 34 to the HP compressor 26. A LP shaft or spool 50, which is disposed coaxially about the engine centerline 12 of the engine 10 within the larger diameter annular HP spool 48, drivingly connects the LP turbine 36 to the LP compressor 24 and fan 20. The spools 48, 50 are rotatable about the engine centerline 12 and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the engine centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The blades 56, 58 may be part of a blisk, rather than being mounted to a disk. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the engine centerline 12, from a blade platform to a blade tip, while the corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complimentary to the rotor portion, the stationary portions of the engine 10, such as the static vanes 60, 62, 72, 74 among the compressor and turbine sections 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering and exiting the combustor 30 is significantly increased. As such, cooling provided by the bleed air 77 is supplied to downstream turbine components (e.g., a blade 68) subjected to the heightened temperature environments.

A remaining portion of the airflow exiting the fan section, a bypass airflow 78 bypasses the LP compressor 24 and engine core 44 and exits the engine 10 through a stationary vane row, and more particularly an outlet guide vane assembly 80, comprising a plurality of airfoil guide vanes 82, at a fan exhaust side 84. More specifically, a circumferential row of radially extending airfoil guide vanes 82 are utilized adjacent the fan section 18 to exert some directional control of the bypass airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
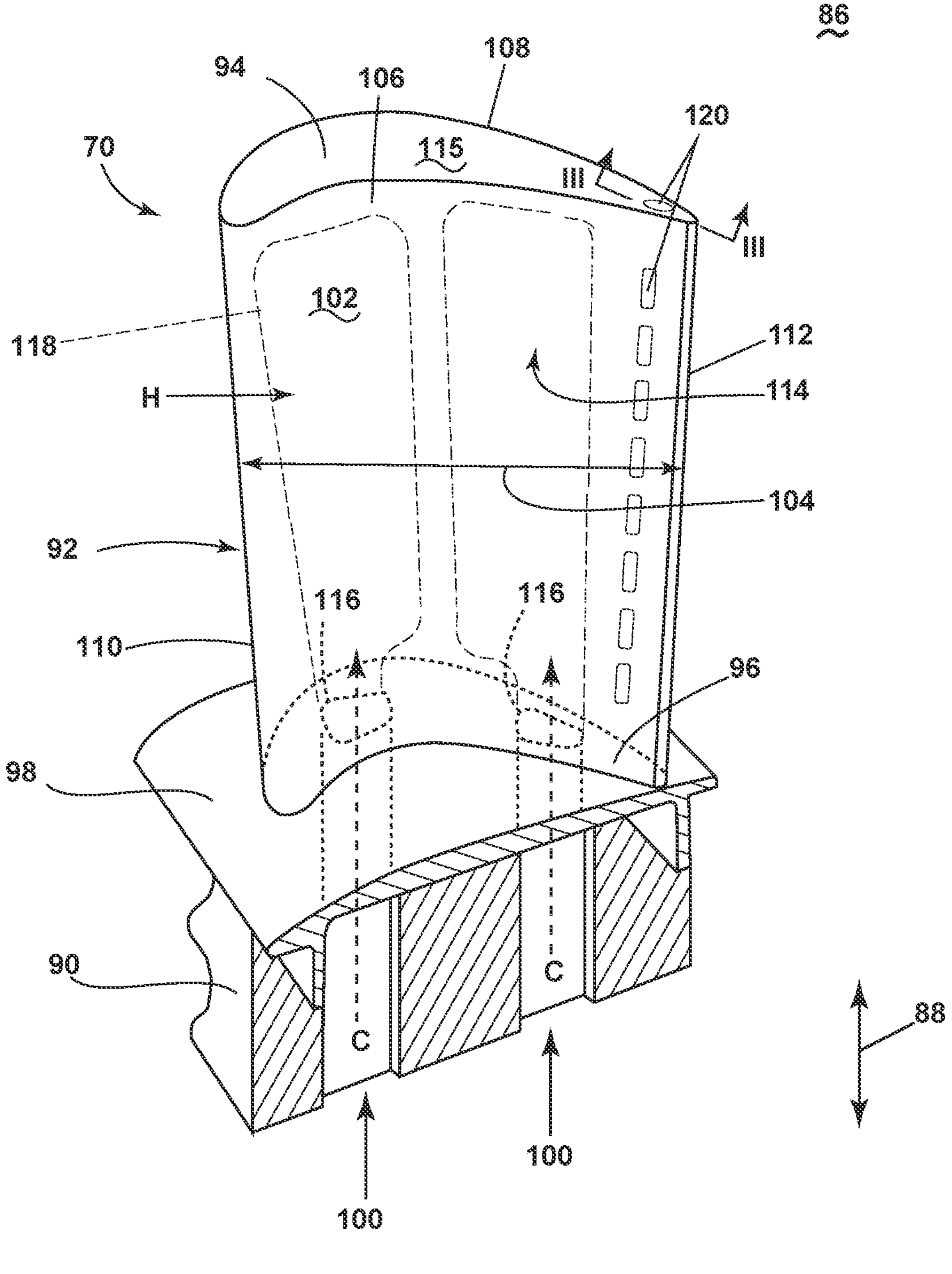
FIG. 2 is a perspective view of an airfoil for the gas turbine engine of FIG. 1 including internal passages illustrated in phantom.

FIG. 2 is a perspective view of an engine component in the form of a turbine blade assembly 86 with a turbine blade 70 of the engine 10 from FIG. 1. Alternatively, the engine component can be a vane, a strut, a service tube, a shroud, or a combustion liner in non-limiting examples, or any other engine component that can require or utilize cooling passages.

The turbine blade assembly 86 includes a dovetail 90 and an airfoil 92. The airfoil 92 extends between a tip 94 and a root 96 to define a span-wise direction 88. The airfoil 92 mounts to the dovetail 90 on a platform 98 at the root 96. When multiple airfoils are circumferentially arranged in side-by-side relationship, the platform 98 helps to radially contain the turbine engine mainstream air flow and forms the radially inner wall of an annulus through which the air flows. The dovetail 90 can be configured to mount to the turbine rotor disk 71 on the engine 10 from FIG. 1. The dovetail 90 further includes at least one inlet passage 100 extending through the dovetail 90 to provide internal fluid communication with the airfoil 92.

The airfoil 92 includes a first side 106, illustrated as a concave-shaped pressure side, and a second side 108, illustrated as a convex-shaped suction side, the first and second sides 106, 108 are joined together to define an airfoil cross-sectional shape of the airfoil 92. The airfoil 92 extends between an upstream edge 110, or a leading edge as illustrated, and a downstream edge 112, or a trailing edge as illustrated, to define a chord-wise direction 104. An outer periphery of the airfoil 92 is bound by an outer wall 114, which also defines the first and second sides 106, 108. The outer wall 114 can face a hot gas fluid flow (denoted “H”) to define a heated surface 115.

An interior 102 of the airfoil 92 can include at least one cooling supply conduit 118, illustrated in dashed line. The at least one cooling supply conduit 118 can be fluidly coupled with the inlet passage 100 at a supply inlet 116. A cooling fluid flow (denoted “C”) can be supplied from the at least one cooling supply conduit 118. At least one cooling hole 120 can be located along any portion of the outer wall 114 including at the tip 94 and along the downstream edge 112 as illustrated.

The at least one cooling hole 120 can pass through a substrate, which by way of illustration is outer wall 114. It should be understood, however, that the substrate can be any wall within the engine 10 including but not limited to interior walls, a tip wall, or a combustion liner wall.

Materials used to form the substrate and the cooling architecture can include, but are not limited to, steel, refractory metals such as titanium, or superalloys based on nickel, cobalt, or iron, and ceramic matrix composites. The substrate and cooling architecture can be formed by a variety of methods, including additive manufacturing, casting, electroforming, or direct metal laser melting, in non-limiting examples.

Figure 3:
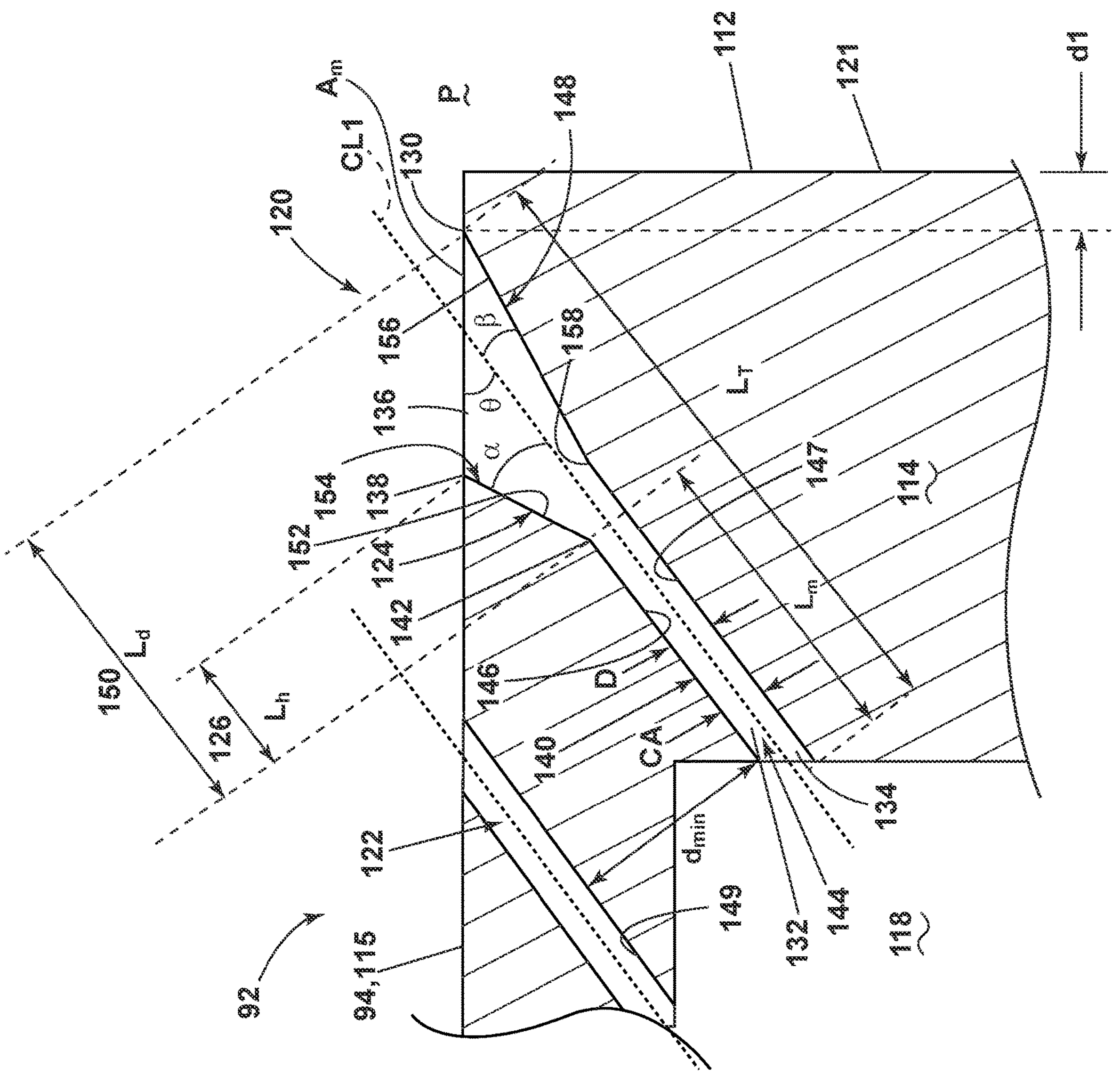
FIG. 3 is an enlarged schematic side view of a top portion of the airfoil of FIG. 2 illustrating a first cooling hole and a second cooling hole with an asymmetrical shape according to one aspect of the disclosure discussed herein.

FIG. 3 is a schematic cross-section taken along line of FIG. 2. A portion of the cooling supply conduit 118 is separated from an exterior surface 121 of the airfoil 92 by the outer wall 114. The at least one cooling hole 120 can include a first cooling hole 122 and a second cooling hole 124 located downstream from the first cooling hole 122 and spaced from each other a minimum distance (denoted “$d_{min}$”). The second cooling hole 124 includes a passage 132 extending between an inlet 134 and an outlet 136. The inlet 134 is open to the cooling supply conduit 118. The inlet 134 can define a first centerline (denoted “CL1”) extending from a geometric center of the inlet 134 toward the outlet 136. The outlet 136 can extend between an upstream end 138 and a downstream end 130 with respect to the hot gas fluid flow H (FIG. 2) to define a major axis (denoted “$A_m$”) of the outlet 136. The downstream end 130 is spaced from the downstream edge 112 a first distance (denoted “d1”).

A first portion 140 of the second cooling hole 124 can extend from the inlet 134 to a junction 142. The first portion 140 can include a metering section 144. The metering section 144 can be provided at or near the inlet 134, and extend along the passage 132 while maintaining a constant or nearly constant cross-sectional area (denoted “CA”) with a hydraulic diameter (denoted “D”). The junction 142 is located where the cross-sectional area CA begins to increase. In one iteration the metering section 144 and the first portion 140 are one in the same. The first centerline CL1 extends straight through a geometric center of the cross-sectional area CA of the metering section 144 and out of the outlet 136, though not through a geometric center of the outlet 136. The metering section 144 defines the smallest, or minimum cross-sectional area CA of the passage 132. The metering section 144 can be located anywhere within the passage 132 where the cross-sectional area CA is the smallest within the passage 132. It is contemplated that the metering section 144 defines the inlet 134 and extends therefrom as illustrated to the junction 142. The metering section 144 can define a metering length (denoted "$L_m$") within the passage 132 measured parallel to the first centerline CL1 from the inlet 134 to the junction 142. The metering length $L_m$ is greater than or equal to zero. The metering section 144 is for metering of the mass flow rate of the cooling fluid flow C. A ratio of the metering length $L_m$ to the hydraulic diameter D is greater than 2, in other words $L_m/D>2.0$.

A second portion 148 of the second cooling hole 124 can extend from the junction 142 to the downstream end 130 of the outlet 136. The second portion 148 can include a diffusing section 150. The diffusing section 150 can define a diffusing length (denoted "$L_d$") measured as a straight-line distance along the first centerline CL1 from the junction 142 to the outlet 136 at the downstream end 130. The passage 132 can have a top wall 146 and a bottom wall 147, where the top wall 146 and bottom wall 147 run substantially parallel to each other in the first portion 140 and angle upward toward the tip 94 (FIG. 2) or downward toward the downstream edge 112 in the second portion 148. The minimum distance drain is measured along a line perpendicular to the first centerline CL1 between the top wall 146 of the second cooling hole 124 and a bottom wall 149 of the first cooling hole 122.

A total length (denoted "$L_T$") of the passage 132 for the second cooling hole 124 is equal to the metering length $L_m$ plus the diffusing length $L_d$. The total length $L_T$ is a straight-line distance measured along the first centerline between the inlet 134 and the outlet 136. A ratio of the total length $L_T$ to the hydraulic diameter D is between or equal to 15 and 65, in other words $15\leq L_T/D\leq 65$. In some implementations the range can narrow to greater than or equal to 19 and less than or equal to 40 ($19\leq L_T/D\leq 40$).

The major axis $A_m$ lies within a major axis plane (denoted "P") intersecting the first centerline CL1 and the upstream and downstream ends 138, 130. The major axis plane P is essentially parallel to the page. At the junction 142 the top wall 146 angles away from the first centerline CL1 to define a hood 154. A hood length (denoted "$L_h$") is measured parallel to the first centerline CL1 from the junction 142 to the upstream end 138 of the outlet 136. A ratio of the hood length $L_h$ to the hydraulic diameter D is greater than 2.5, in other words $L_h/D>2.5$. A portion of the hood 154, referred to herein as a layup surface 152, extends from the junction 142 to the upstream end 138. A first angle (α) is defined between the first centerline CL1 and the layup surface 152 within the major axis plane P. While illustrated as a straight line, it should be understood that the layup surface 152 can be curved wherein the first angle (α) defines the highest bend along the layup surface 152.

The bottom wall 147 angles downward away from the first centerline (CL1) to define a layback surface 156. The layback surface 156 bends down at a second angle (β) defined between the first centerline CL1 and the layback surface 156 within the major axis plane P. The second angle (β) is less than the first angle (α). The layback surface 156 extends to the downstream end 130. The layback surface 156 can commence at the junction 142 or at a location 158 downstream of the junction 142 along the bottom wall 147 as illustrated. The layup surface 152 and the layback surface 156 can define at least a portion of the outlet 136 and the diffusing section 150. While illustrated as a straight line, it should be understood that the layback surface 156 can be curved wherein the second angle (β) defines the highest bend along the layback surface 156. The first centerline CL1 further forms a tip angle (θ) between the heated surface 115 (FIG. 2) at the tip 94 (FIG. 2) and the first centerline CL1. The tip angle (θ) can range between 0° and 35°.

The diffusing section 150 can expand into and out of the page as well as in an upward direction at the first angle (α) with respect to the major axis between the junction 142 and the location 158. Expansion can continue into and out of the page as well as up at the first angle (α) and down at the second angle (β) between the location 158 and the outlet 136. It is further contemplated that the diffusing section 150 starts in all directions at the junction 142.

While illustrated as flat, it should be understood that the layup and layback surfaces 152, 156 are not necessarily flat and that the first angle (α) and the second angle (β) described herein are with respect to an average slope of the layup and layback surfaces 152, 156 and the surface with which any of the first angle (α) or the second angle (β) herein are described.

Figure 4:
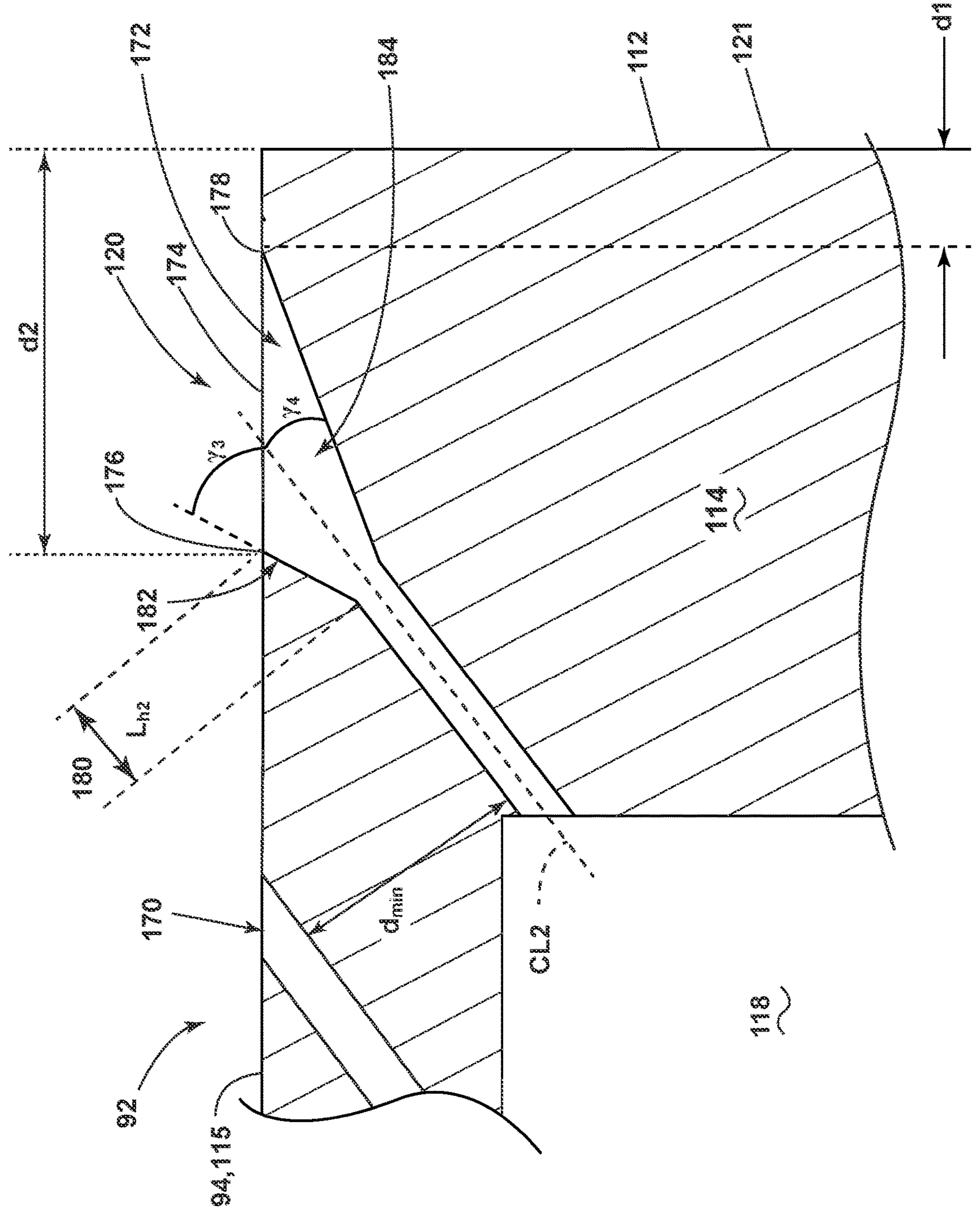
FIG. 4 is the enlarged schematic side view of a top portion of an airfoil at the same location as FIG. 3 illustrating a first exemplary cooling hole and a second exemplary cooling hole with a symmetrical shape.

FIG. 4 is an enlarged schematic view of a portion at the same location as FIG. 3 for a component like the airfoil 92 (FIG. 2) illustrating a first exemplary cooling hole 170 and a second exemplary cooling hole 172. The first and second exemplary cooling holes 170, 172 are spaced from each other the minimum distance (denoted "$d_{min}$"). Each of the first and second exemplary cooling holes 170, 172 include typical cooling hole parts as already described herein. A second centerline (denoted "CL2") extends through the second exemplary cooling hole 172. An outlet 174 extends between an upstream end 176 and a downstream end 178. The downstream end 178 is spaced the first distance d1 from the downstream edge 112 and the upstream end 176 is spaced a second distance d2 from the downstream edge 112. An exemplary hooded section 180 extends a second hood length (denoted "$L_{h2}$"). The second exemplary cooling hole 172 has a diffuser shaped opening 182 with a symmetrical expanding section 184. "Symmetrical" in that the symmetrical expanding section 184 expands away from the second centerline CL2 at a third angle ($\gamma_3$) and a fourth angle ($\gamma_4$) equal to each other.

Figure 5:
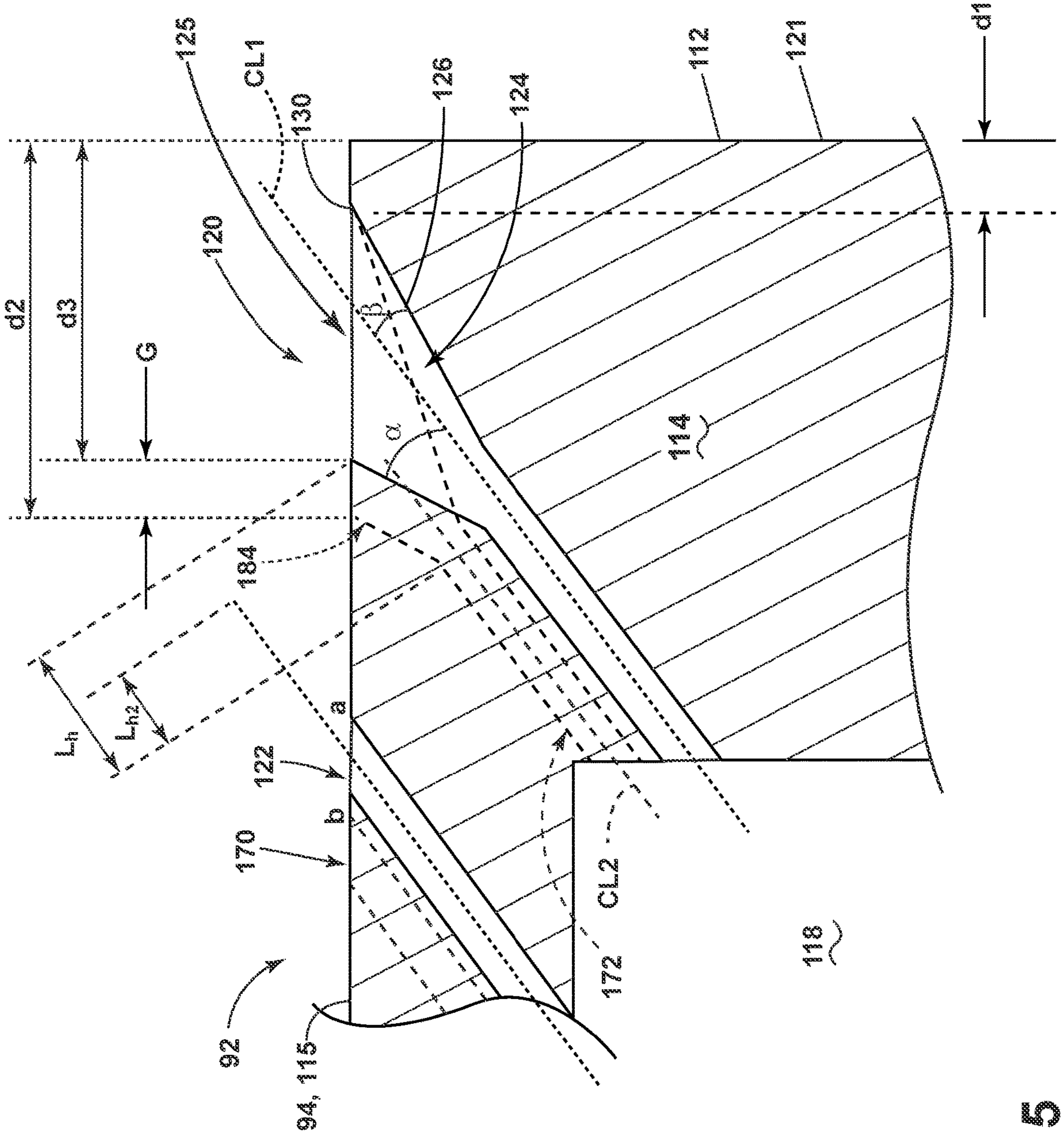
FIG. 5 the enlarged schematic top view of FIG. 3 illustrating the first and second exemplary cooling holes in dashed line with the first and second cooling holes in solid line.

FIG. 5 is the same view as FIG. 3 only with the first and second exemplary cooling holes 170, 172 illustrated in dashed line for reference only and some numbers removed for clarity. The second cooling hole 124 has a diffuser shaped opening 125 with an asymmetrical expanding section 126. "Asymmetrical" in that the asymmetrical expanding section 126 expands toward the tip 94 at the first angle (α) and toward the downstream edge 112 at the second angle (β) different than the first angle (α) with respect to the first centerline CL1. The first and second angles (α, β) are not equal, but can both vary between 0° and 30°. The hood length $L_h$ further defines a length of the asymmetrical expanding section 126. The asymmetrical expanding section 126 provides for a longer hood length $L_h$ with respect to the second hood length Li of the second exemplary cooling hole 172 (FIG. 4).

It can be seen that the second cooling hole 124 and the second exemplary cooling hole 172, though located in different components, if they were in the same component would both terminate at an exemplary overlapping location spaced from the downstream edge 112 the first distance (denoted "d1"). While illustrated as spaced from the downstream edge 112, it should be understood that d1 can be greater than or equal to zero. In other words the outlet 174 could terminate at the downstream edge 112. The asymmetrical expanding section 126 terminates at a third distance (denoted "d3") from the downstream edge 112 that is less than the second distance d2. A geometry shift between the second exemplary cooling hole 172 and the second cooling hole 124, and more particularly from the symmetrical expanding section 184 to the asymmetrical expanding section 126 allows for a gain in additional film hole expansion area (denoted "G"). This geometry shift causes an increase from the third angle ($\gamma_3$) to the first angle ($\alpha$) and a decrease from the fourth angle ($\gamma_4$) to the second angle ($\beta$). The asymmetrical expanding section 126 enables a gain in additional film hole expansion area G while maintaining some spacing d1 from the downstream edge 112.

When the second cooling hole 124 is formed, the first cooling hole 122 exhausts at a first location (denoted "a") closer to the downstream edge 112 of the airfoil 92 than if the first exemplary cooling hole 170 was formed. With the second exemplary cooling hole 172 in place with the symmetrical expanding section 184 the first exemplary cooling hole 170 exhausts at a second location (denoted "b") upstream from the first location "a". The geometry shift as described herein enables the formation of more cooling holes while maintaining the minimum distance $d_{min}$ and with the second cooling hole 124 exhausting at the first distance d1 from the downstream edge 112.

Figure 6:
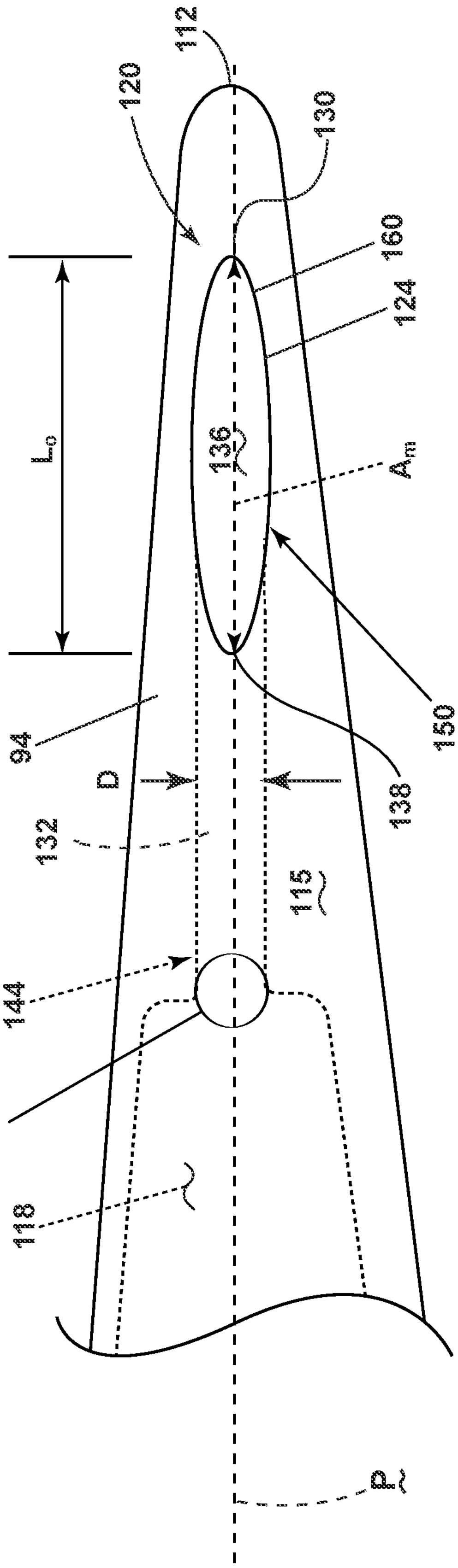
FIG. 6 is an enlarged schematic top view of the top portion of the airfoil of FIG. 3 illustrating the cooling hole and an outlet of the cooling hole according to an aspect of the disclosure herein.

Turning to FIG. 6, a top down view of the same portion of the airfoil 92 from FIG. 3 is illustrated. The outlet 136 defines a substantially oval shape 160 with the major axis $A_m$ extending an outlet length (denoted "$L_o$") between the upstream end 138 and the downstream end 130. The passage 132 with the hydraulic diameter D defining a ratio of the outlet length to the hydraulic diameter D between 2 and 12, in other words $2.0<L_o/D<12$.

Benefits associated with the disclosure discussed herein include increased cooling hole density in limited space regions, in this case depicted in an airfoil tip trailing edge. The geometry shift from the symmetrical shape to the asymmetrical shape in general, however, can be applied in multiple engine components to increase cooling while maintaining component geometry. In this case the gain in additional film hole expansion area without removal of any portion of the downstream edge of the airfoil.

It should be understood that any combination of the geometry related to the orientation of the first and second tip portions with respect to each other and the tip channel is contemplated. The varying aspects of the disclosure discussed herein are for illustrative purposes and not meant to be limiting.

Drilling, investment casting, 3-D printing, or additive manufacturing are exemplary methods of forming the cooling circuits and cooling holes as described herein. It should be understood that other methods of forming the cooling circuits and cooling holes described herein are also contemplated and that the methods disclosed are for exemplary purposes only.

It should be appreciated that application of the disclosed design is not limited to turbine engines with fan and booster sections, but is applicable to turbojets and turbo engines as well.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

An airfoil for a turbine engine, which generates a hot gas fluid flow, and provides a cooling fluid flow, the airfoil comprising a wall separating the hot gas fluid flow from the cooling fluid flow, bounding an interior facing the cooling fluid flow, defining a heated surface along which the hot gas fluid flow flows, and including an upstream edge, a downstream edge, and a tip of the airfoil; at least one cooling supply conduit, provided in the interior, through which cooling fluid flows; and a cooling hole comprising a passage extending between an inlet fluidly coupled to the cooling fluid flow and an outlet at the heated surface, the outlet extending between an upstream end and downstream end with respect to the cooling fluid flow, the passage having a first portion and a second portion, the first portion defining a centerline extending from the inlet to meet the second portion at a junction, the second portion including a diffusing section comprising: a layup surface bending away from the centerline in a first direction and extending to the upstream end to define a first angle ($\alpha$), as viewed in a major axis plane in which the centerline lies, between the centerline and the layup surface, where the first angle is greater than zero degrees; and a layback surface bending away from the passage in a second direction opposite the first direction and extending to the downstream end to define a second angle ($\beta$), as viewed in the major axis plane, between the centerline and the layback surface, where the second angle is less than the first angle ($\beta<\alpha$).

The airfoil of any preceding clause wherein the cooling hole is located at a portion of the airfoil at the downstream edge and the outlet is located at the tip.

The airfoil of any preceding clause further comprising a tip angle ($\theta$), as viewed in the major axis plane, defined between the heated surface at the tip and the centerline.

The airfoil of any preceding clause wherein the tip angle ($\theta$) is between 0° and 35° ($0°<\theta<35°$).

The airfoil of any preceding clause wherein the first angle ($\alpha$) is between 0° and 30° ($0°<\alpha<30°$) and the second angle ($\beta$) is between 0° and 30° ($0°<\beta<30°$).

The airfoil of any preceding clause wherein the outlet has an oval shape and a major axis of the oval shape measured between the upstream end and the downstream end defines an outlet length (Lo).

The airfoil of any preceding clause wherein the passage defines a hydraulic diameter (D) along the first portion and a ratio Lo/D is between 2 and 12 (2<Lo/D<12).

The airfoil of any preceding clause wherein a straight-line distance along the centerline between the inlet and the outlet defines a total length (LT) of the passage and a ratio LT/D is greater than or equal to 15 and less than or equal to 65 (15<LT/D<65).

The airfoil of any preceding clause wherein the ratio LT/D is greater than or equal to 19 and less than or equal to 40 (19<LT/D<40).

The airfoil of any preceding clause wherein the first portion includes a metering section terminating at the junction.

The airfoil of any preceding clause wherein a straight-line distance along the centerline between the inlet and the junction defines a metering length (Lm) and a ratio Lm/D is greater than 2 and less than 35 $(2<Lm/D<35)$.

The airfoil of any preceding clause wherein a straight-line distance along the centerline between the junction and the outlet defines a diffusing length (Ld) and a ratio Ld/D is greater than 2.5 and less than 35 $(2<Lm/D<35)$.

A cooling hole for an engine component, the cooling hole comprising a passage extending between an inlet fluidly coupled to a cooling fluid flow and an outlet along a heated surface of the engine component, the outlet extending between an upstream end and downstream end with respect to the cooling fluid flow, the passage having a first portion and a second portion, the first portion defining a centerline extending from a geometric center of the inlet toward the outlet between a top wall and a bottom wall of the passage, the second portion including a diffusing section comprising: a layup surface bending away from the centerline in a first direction and extending to the upstream end to define a first angle ($\alpha$), as viewed in a major axis plane in which the centerline lies, between the centerline and the layup surface, where the first angle is greater than zero degrees; and a layback surface bending away from the passage in a second direction opposite the first direction and extending to the downstream end to define a second angle ($\beta$), as viewed in the major axis plane, between the centerline and the layback surface, where the second angle is less than the first angle $(\beta<\alpha)$.

The cooling hole of any preceding clause wherein the first angle ($\alpha$) is between 0° and 30° $(0°<\alpha<30°)$ and the second angle ($\beta$) is between 0° and 30° $(0°<\beta<30°)$.

The cooling hole of any preceding clause wherein the outlet has an oval shape and a major axis of the oval shape measured between the upstream end and the downstream end defines an outlet length (Lo).

The cooling hole of any preceding clause wherein the passage defines a hydraulic diameter (D) along the first portion and wherein a ratio Lo/D is between 2 and 12 $(2<Lo/D<12)$.

The cooling hole of any preceding clause wherein a straight-line distance along the centerline between the inlet and the outlet defines a total length (LT) of the passage and a ratio LT/D is greater than or equal to 15 and less than or equal to 65 $(15<LT/D<65)$.

The cooling hole of any preceding clause wherein the first portion includes a metering section terminating at the layup surface to define a junction.

The cooling hole of any preceding clause wherein a straight-line distance along the centerline between the inlet and the junction defines a metering length (Lm) where a ratio Lm/D is greater than 2 and less than 35 $(2<Lm/D<35)$.

The cooling hole of any preceding clause wherein a straight-line distance along the centerline between the junction and the outlet defines a diffusing length (Ld) and a ratio Ld/D is greater than 2.5 and less than 35 $(2<Ld/D<35)$.

The invention claimed is:

1. An airfoil for a turbine engine, which generates a hot gas fluid flow, and provides a cooling fluid flow, the airfoil comprising:

a wall separating the hot gas fluid flow from the cooling fluid flow, bounding an interior facing the cooling fluid flow, defining a heated surface along which the hot gas fluid flow flows, and including an upstream edge, a downstream edge, and a tip of the airfoil;

at least one cooling supply conduit, provided in the interior, through which cooling fluid flows; and a cooling hole comprising a passage extending between an inlet fluidly coupled to the cooling fluid flow and an outlet at the heated surface, the outlet extending between an upstream end and downstream end with respect to the cooling fluid flow, the outlet having an oval shape wherein a major axis of the oval shape measured between the upstream end and the downstream end defines an outlet length ($L_o$), the passage having a first portion and a second portion, the first portion defining a centerline extending from the inlet to meet the second portion at a junction, the second portion including a diffusing section comprising, and wherein the passage defines a hydraulic diameter (D) along the first portion and a ratio $L_o/D$ is between 2 and 12 $(2<L_o/D<12)$:

a layup surface bending away from the centerline in a first direction and extending to the upstream end to define a first angle ($\alpha$), as viewed in a major axis plane in which the centerline lies, between the centerline and the layup surface, where the first angle is greater than zero degrees; and a layback surface bending away from the passage in a second direction opposite the first direction and extending to the downstream end to define a second angle ($\beta$), as viewed in the major axis plane, between the centerline and the layback surface, where the second angle is less than the first angle $(\beta<\alpha)$.

2. The airfoil of claim 1 wherein the cooling hole is located at a portion of the airfoil at the downstream edge and the outlet is located at the tip.

3. The airfoil of claim 2 further comprising a tip angle ($\theta$), as viewed in the major axis plane, defined between the heated surface at the tip and the centerline.

4. The airfoil of claim 3 wherein the tip angle ($\theta$) is between 0° and 35° $(0°<\theta<35°)$.

5. The airfoil of claim 1 wherein the first angle ($\alpha$) is between 0° and 30° $(0°<\alpha<30°)$ and the second angle ($\beta$) is between 0° and 30° $(0°<\beta<30°)$.

6. The airfoil of claim 1 wherein a straight-line distance along the centerline between the inlet and the outlet defines a total length ($L_T$) of the passage and a ratio $L_T/D$ is greater than or equal to 15 and less than or equal to 65 $(15\leq L_T/D\leq 65)$.

7. The airfoil of claim 6 wherein the ratio $L_T/D$ is greater than or equal to 19 and less than or equal to 40 $(19\leq L_T/D\leq 40)$.

8. The airfoil of claim 1 wherein the first portion includes a metering section terminating at the junction.

9. The airfoil of claim 8 wherein a straight-line distance along the centerline between the inlet and the junction defines a metering length ($L_m$) and a ratio $L_m/D$ is greater than 2 and less than 35 $(2\leq L_m/D\leq 35)$.

10. The airfoil of claim 1 wherein a straight-line distance along the centerline between the junction and the outlet defines a diffusing length ($L_d$) and a ratio $L_d/D$ is greater than 2.5 and less than 35 $(2\leq L_m/D\leq 35)$.

11. A cooling hole for an engine component, the cooling hole comprising:

a passage extending between an inlet fluidly coupled to a cooling fluid flow and an outlet along a heated surface of the engine component, the outlet extending between an upstream end and downstream end with respect to the cooling fluid flow and the outlet having an oval shape and a major axis of the oval shape measured between the upstream end and the downstream end defines an outlet length ($L_o$), the passage having a first portion and a second portion, the first portion defining a centerline extending from a geometric center of the inlet toward the outlet between a top wall and a bottom wall of the passage, the second portion including a diffusing section comprising, the passage defines a hydraulic diameter (D) along the first portion and wherein a ratio $L_o/D$ is between 2 and 12 ($2<L_o/D<12$):

a layup surface bending away from the centerline in a first direction and extending to the upstream end to define a first angle (α), as viewed in a major axis plane in which the centerline lies, between the centerline and the layup surface, where the first angle is greater than zero degrees; and a layback surface bending away from the passage in a second direction opposite the first direction and extending to the downstream end to define a second angle (β), as viewed in the major axis plane, between the centerline and the layback surface, where the second angle is less than the first angle ($\beta<\alpha$).

12. The cooling hole of claim 11 wherein the first angle (α) is between 0° and 30° ($0°<\alpha<30°$) and the second angle (β) is between 0° and 30° ($0°<\beta<30°$).

13. The cooling hole of claim 11 wherein a straight-line distance along the centerline between the inlet and the outlet defines a total length ($L_T$) of the passage and a ratio $L_T/D$ is greater than or equal to 15 and less than or equal to 65 ($15 \leq L_T/D \leq 65$).

14. The cooling hole of claim 11 wherein the first portion includes a metering section terminating at the layup surface to define a junction.

15. The cooling hole of claim 14 wherein a straight-line distance along the centerline between the inlet and the junction defines a metering length ($L_m$) where a ratio $L_m/D$ is greater than 2 and less than 35 ($2 \leq L_m/D \leq 35$).

16. The cooling hole of claim 14 wherein a straight-line distance along the centerline between the junction and the outlet defines a diffusing length ($L_d$) and a ratio $L_d/D$ is greater than 2.5 and less than 35 ($2 \leq L_d/D \leq 35$).

17. A cooling hole for an engine component, the cooling hole comprising a passage extending between an inlet fluidly coupled to a cooling fluid flow and an outlet along a heated surface of the engine component, the outlet extending between an upstream end and downstream end with respect to the cooling fluid flow and the outlet having an oval shape and a major axis of the oval shape measured between the upstream end and the downstream end defines an outlet length ($L_o$), the passage having a first portion and a second portion, the first portion defining a centerline extending from a geometric center of the inlet toward the outlet between a top wall and a bottom wall of the passage, the second portion including a diffusing section comprising, the passage defines a hydraulic diameter (D) along the first portion and wherein a ratio $L_o/D$ is between 2 and 12 ($2<L_o/D<12$).

18. The cooling hole of claim 17 wherein a straight-line distance along the centerline between the inlet and the outlet defines a total length ($L_T$) of the passage and a ratio $L_T/D$ is greater than or equal to 15 and less than or equal to 65 ($15<L_T/D<65$).

19. The cooling hole of claim 17 wherein the first portion includes a metering section terminating at a layup surface to define a junction.

20. An airfoil for a turbine engine, which generates a hot gas fluid flow, and provides a cooling fluid flow, the airfoil comprising the cooling hole of claim 17.

* * * * *